United States Patent
Bostick et al.

(10) Patent No.: US 10,546,153 B2
(45) Date of Patent: Jan. 28, 2020

(54) ATTENTION BASED ALERT NOTIFICATION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 15/270,436

(22) Filed: Sep. 20, 2016

(65) Prior Publication Data

US 2018/0081514 A1 Mar. 22, 2018

(51) Int. Cl.
*G06F 21/62* (2013.01)
*H04L 12/58* (2006.01)
(Continued)

(52) U.S. Cl.
CPC ....... *G06F 21/6254* (2013.01); *H04B 1/3833* (2013.01); *H04L 51/24* (2013.01); *H04L 63/0861* (2013.01); *H04L 63/10* (2013.01); *H04L 67/18* (2013.01); *H04L 67/24* (2013.01); *G06F 3/013* (2013.01); *H04L 67/12* (2013.01)

(58) Field of Classification Search
CPC .. G06F 21/6254; G06F 21/31; G06F 21/6245; G06F 21/84; G06F 3/013; G08B 3/10; H04B 1/3833; H04L 63/0861; H04L 63/10; H04L 67/18; H04L 67/24;
(Continued)

(56) References Cited

U.S. PATENT DOCUMENTS 6,697,947 B1 * 2/2004 Matyas, Jr. ........... H04L 9/3231
380/282
7,130,452 B2 * 10/2006 Bolle ................... G06F 21/6245
382/115
(Continued)

OTHER PUBLICATIONS

Peter Mell et al, The NIST Definition of Cloud Computing, National Institute of Standards and Technology, Publication 800-145, 2011.

*Primary Examiner* — Stella Higgs
(74) *Attorney, Agent, or Firm* — Patrick J. Daugherty; Daugherty & Del Zoppo Co., LPA (57) ABSTRACT

Alert notification content is conveyed to an authorized user and other persons oriented relative to the mobile device to perceive the alert notification content during an ephemeral alert period, in response to determining that the authorized user is oriented to perceive the alert notification content during the ephemeral alert period, and that only the authorized user is proximate enough to perceive the alert notification content conveyed by the mobile device, or that is appropriate pursuant to rule or privacy setting applications to convey the alert notification content to each of the other persons. The alert content is muted in response to determining that it is not appropriate pursuant to the rule application or privacy setting to convey the content to the other persons, or that the authorized user is not oriented to perceive the alert notification content during the ephemeral alert period.

17 Claims, 6 Drawing Sheets

(51) Int. Cl.
*H04L 29/08* (2006.01)
*H04L 29/06* (2006.01)
*H04L 12/18* (2006.01)
*H04B 1/3827* (2015.01)
*H04W 4/02* (2018.01)
*H04W 4/08* (2009.01)
*G06F 21/84* (2013.01)
*G06F 3/01* (2006.01)

(58) Field of Classification Search
CPC .......... H04L 67/26; H04L 67/12; H04W 4/02; H04W 4/08
See application file for complete search history.

(56) References Cited

U.S. PATENT DOCUMENTS

| | | | | |
|---|---|---|---|---|
| 7,593,550 | B2* | 9/2009 | Hamza | G06K 9/00597 |
| | | | | 382/117 |
| 8,600,110 | B1* | 12/2013 | Chan | G06F 21/32 |
| | | | | 382/103 |
| 8,723,796 | B2* | 5/2014 | Ptucha | G06F 3/017 |
| | | | | 345/158 |
| 8,937,534 | B2 | 1/2015 | Kreiner et al. | |
| 9,002,379 | B1* | 4/2015 | Yang | H04W 4/022 |
| | | | | 340/539.13 |
| 9,117,066 | B2* | 8/2015 | Nathan | G06F 21/32 |
| 9,319,221 | B1 | 4/2016 | Awad et al. | |
| 9,355,612 | B1* | 5/2016 | Shepard | G09G 5/006 |
| 9,367,677 | B1* | 6/2016 | Adhami | G06F 21/32 |
| 9,984,237 | B2 | 5/2018 | Sprenger | G06F 11/30 |
| 10,025,938 | B2* | 7/2018 | Krishnamurthi | G06F 3/013 |
| 2004/0098462 | A1* | 5/2004 | Horvitz | G05B 19/404 |
| | | | | 709/207 |
| 2004/0104266 | A1* | 6/2004 | Bolle | G06F 21/6245 |
| | | | | 235/382 |
| 2005/0033962 | A1* | 2/2005 | Libin | G07C 9/00103 |
| | | | | 713/170 |
| 2005/0113123 | A1* | 5/2005 | Torvinen | H04W 4/021 |
| | | | | 455/519 |
| 2006/0014532 | A1* | 1/2006 | Seligmann | G06F 21/6218 |
| | | | | 455/420 |
| 2009/0125584 | A1* | 5/2009 | Agrawala | H04W 4/02 |
| | | | | 709/203 |
| 2009/0172103 | A1* | 7/2009 | Tuli | G06Q 10/10 |
| | | | | 709/206 |
| 2010/0124363 | A1* | 5/2010 | Ek | G06F 21/32 |
| | | | | 382/118 |
| 2011/0197263 | A1* | 8/2011 | Stinson, III | G06F 3/011 |
| | | | | 726/4 |
| 2013/0021240 | A1* | 1/2013 | Coulon | G06F 21/6245 |
| | | | | 345/156 |
| 2013/0044055 | A1* | 2/2013 | Karmarkar | G06F 3/013 |
| | | | | 345/158 |
| 2013/0247156 | A1* | 9/2013 | Savo | G06F 21/31 |
| | | | | 726/4 |
| 2013/0254874 | A1* | 9/2013 | Xu | G06F 21/32 |
| | | | | 726/17 |
| 2013/0269013 | A1* | 10/2013 | Parry | H04L 63/0861 |
| | | | | 726/7 |
| 2014/0007225 | A1* | 1/2014 | Gay | G06F 21/36 |
| | | | | 726/19 |
| 2014/0013422 | A1* | 1/2014 | Janus | G06F 21/31 |
| | | | | 726/19 |
| 2014/0082745 | A1* | 3/2014 | Guedalia | G06F 3/0481 |
| | | | | 726/27 |
| 2014/0201844 | A1* | 7/2014 | Buck | G06F 21/50 |
| | | | | 726/26 |
| 2014/0256288 | A1 | 9/2014 | Allen | |
| 2014/0273978 | A1* | 9/2014 | Van Snellenberg | H04W 4/14 |
| | | | | 455/412.2 |
| 2015/0106739 | A1* | 4/2015 | Tan | G06F 3/0484 |
| | | | | 715/750 |
| 2015/0358316 | A1* | 12/2015 | Cronin | H04L 63/0861 |
| | | | | 726/6 |
| 2016/0080510 | A1* | 3/2016 | Dawoud Shenouda Dawoud | H04L 47/808 |
| | | | | 709/225 |
| 2017/0041273 | A1 | 2/2017 | Marcellino | |
| 2017/0180502 | A1 | 6/2017 | Lewis et al. | |
| 2017/0255786 | A1* | 9/2017 | Krishnamurthi | G06F 3/013 |
| 2018/0188935 | A1 | 7/2018 | Singh et al. | |

* cited by examiner

ATTENTION BASED ALERT NOTIFICATION

Personal programmable devices such as desktop computers and mobile devices (personal digital assistants (PDA's), mobile phones, tablets, laptops, etc.) provide support for a wide variety of message notification applications. Commonly an alert containing notice of an incoming message text or other event occurrence will appear on a user screen temporarily, wherein the alert display content conveys some information or aspect of the associated received message, appointment reminder occurrence or other event item. For example, a banner notification may appear temporarily across the top of the screen of a mobile device displaying the sender of a just-received text message, the subject matter and time of an upcoming or current appointment, a summary of text content within a received email, a sporting event score alert, an instant message, etc. Such banner notifications may persist until acknowledged, or they may disappear after elapse of a set period of time. In some applications, they may be displayed even though the image screen is locked from displaying any other content.

BRIEF SUMMARY

In one aspect of the present invention, a computerized method for attention based alert notifications includes executing steps on a computer processor. Thus, a computer processor identifies persons are that are proximate enough to a mobile device to perceive alert notification content during an ephemeral alert period. In response to determining that the persons identified as proximate enough to the mobile device to perceive the alert notification content consist of only an authorized user of the mobile device, and that the authorized user is oriented in space relative to the mobile device to perceive the alert notification content during the ephemeral alert period, the alert notification content to the authorized user is conveyed during the ephemeral alert period. In response to determining that the persons identified as proximate enough to the mobile device to perceive the alert notification content include other persons in addition to the authorized user, a relevant subset of the other persons is identified as oriented in space relative to the mobile device to perceive the alert notification content during the ephemeral alert period. In response to determining that it is appropriate pursuant to a rule application to convey the alert notification content to each of the relevant subset of other persons, and to determining that the authorized user is oriented in space relative to the mobile device to perceive the alert notification content during the ephemeral alert period, the alert notification content is conveyed to the authorized user and to the relevant subset of the other persons during the ephemeral alert period. The alert notification is muted in response to determining that it is not appropriate pursuant to the rule application to convey the content to each of the relevant subset of the other persons, or in response to determining that the authorized user is not oriented in space relative to the mobile device to perceive the alert notification content during the ephemeral alert period.

In another aspect, a system has a hardware processor in circuit communication with a computer readable memory and a computer-readable storage medium having program instructions stored thereon. The processor executes the program instructions stored on the computer-readable storage medium via the computer readable memory and thereby identifies persons are that are proximate enough to a mobile device to perceive alert notification content during an ephemeral alert period. In response to determining that the persons identified as proximate enough to the mobile device to perceive the alert notification content consist of only an authorized user of the mobile device, and that the authorized user is oriented in space relative to the mobile device to perceive the alert notification content during the ephemeral alert period, the alert notification content to the authorized user is conveyed during the ephemeral alert period. In response to determining that the persons identified as proximate enough to the mobile device to perceive the alert notification content include other persons in addition to the authorized user, a relevant subset of the other persons is identified as oriented in space relative to the mobile device to perceive the alert notification content during the ephemeral alert period. In response to determining that it is appropriate pursuant to a rule application to convey the alert notification content to each of the relevant subset of other persons, and to determining that the authorized user is oriented in space relative to the mobile device to perceive the alert notification content during the ephemeral alert period, the alert notification content is conveyed to the authorized user and to the relevant subset of the other persons during the ephemeral alert period. The alert notification is muted in response to determining that it is not appropriate pursuant to the rule application to convey the content to each of the relevant subset of the other persons, or in response to determining that the authorized user is not oriented in space relative to the mobile device to perceive the alert notification content during the ephemeral alert period.

In another aspect, a computer program product for attention based alert notifications has a computer-readable storage medium with computer readable program code embodied therewith. The computer readable hardware medium is not a transitory signal per se. The computer readable program code includes instructions for execution which cause the processor to identify persons are that are proximate enough to a mobile device to perceive alert notification content during an ephemeral alert period. In response to determining that the persons identified as proximate enough to the mobile device to perceive the alert notification content consist of only an authorized user of the mobile device, and that the authorized user is oriented in space relative to the mobile device to perceive the alert notification content during the ephemeral alert period, the alert notification content to the authorized user is conveyed during the ephemeral alert period. In response to determining that the persons identified as proximate enough to the mobile device to perceive the alert notification content include other persons in addition to the authorized user, a relevant subset of the other persons is identified as oriented in space relative to the mobile device to perceive the alert notification content during the ephemeral alert period. In response to determining that it is appropriate pursuant to a rule application to convey the alert notification content to each of the relevant subset of other persons, and to determining that the authorized user is oriented in space relative to the mobile device to perceive the alert notification content during the ephemeral alert period, the alert notification content is conveyed to the authorized user and to the relevant subset of the other persons during the ephemeral alert period. The alert notification is muted in response to determining that it is not appropriate pursuant to the rule application to convey the content to each of the relevant subset of the other persons, or in response to determining that the authorized user is not oriented in space relative to the mobile device to perceive the alert notification content during the ephemeral alert period.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
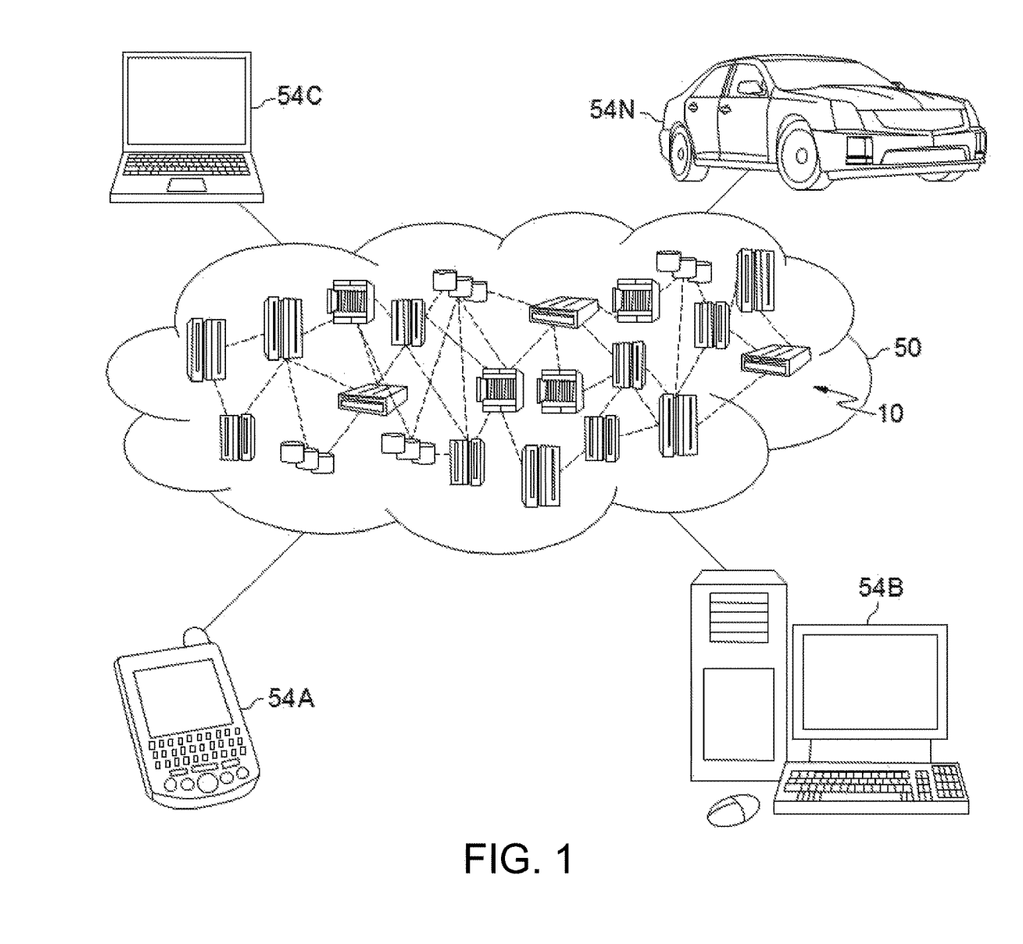
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
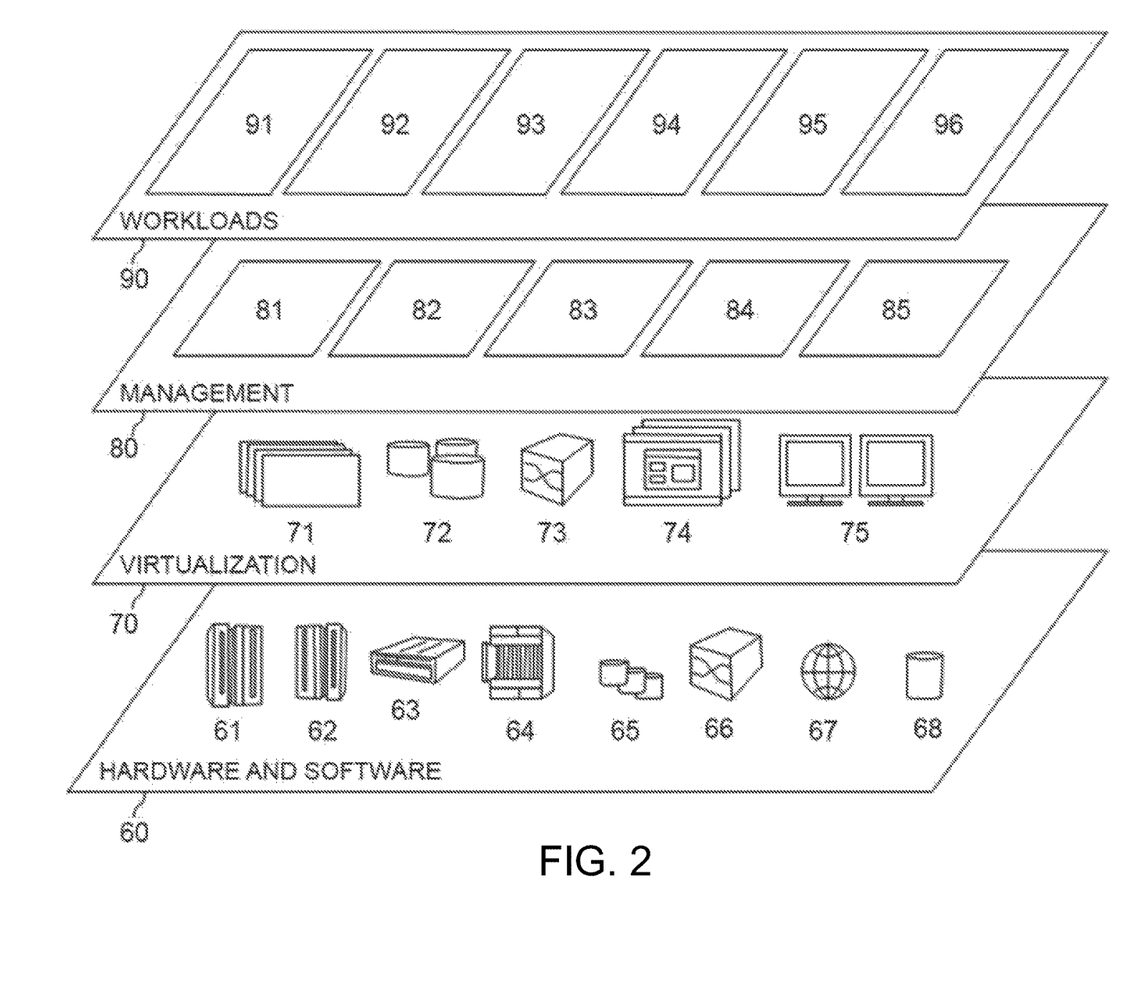
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
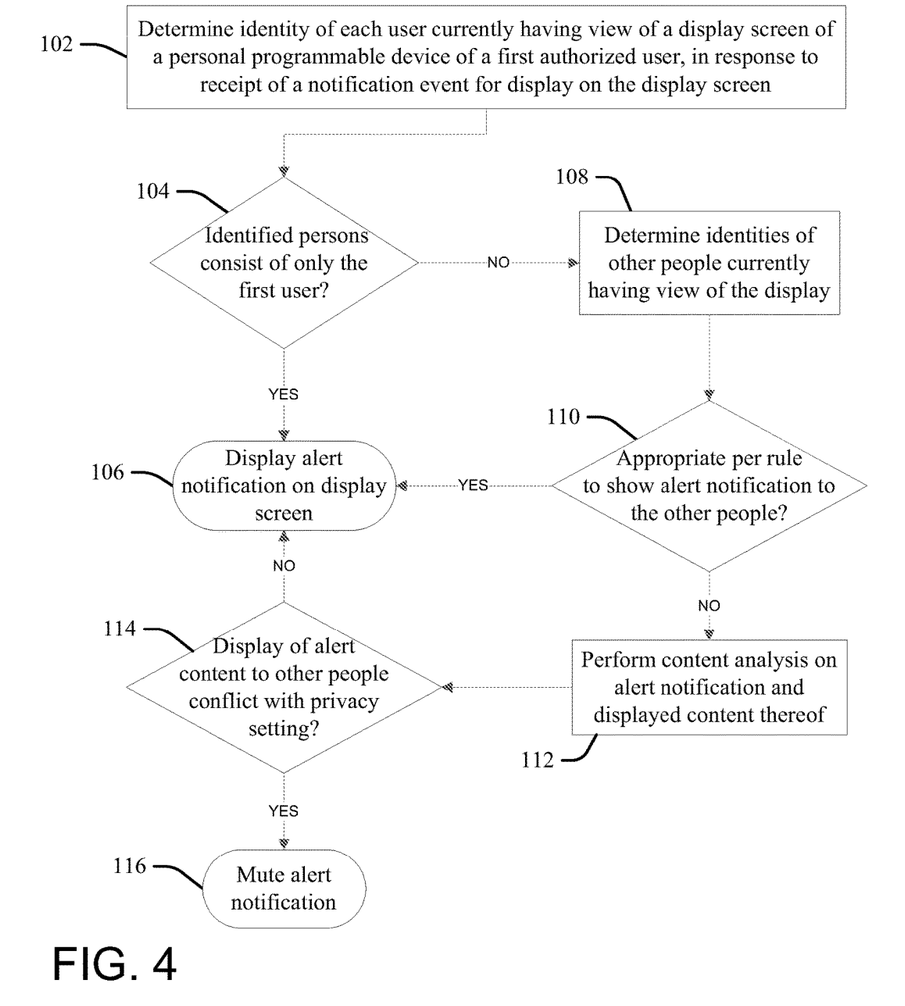
FIG. 4 is a flow chart illustration of attention based alert notification according to an embodiment of the present invention.
Figure 5:
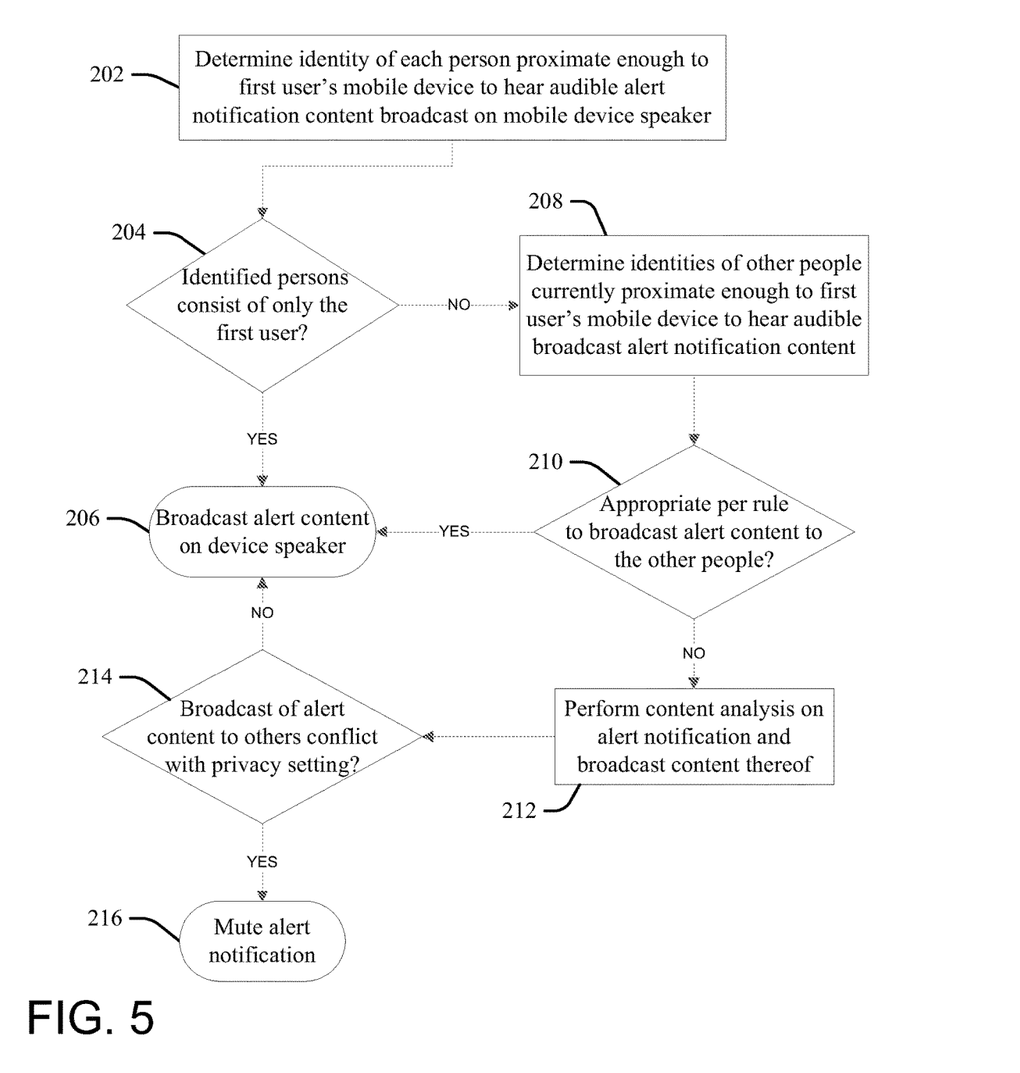
FIG. 5 is a flow chart illustration of attention based alert notification according to another embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 according to embodiments of the present invention, for example to execute the process steps or system components or tasks as depicted in FIGS. 4 and 5 below.

Figure 3:
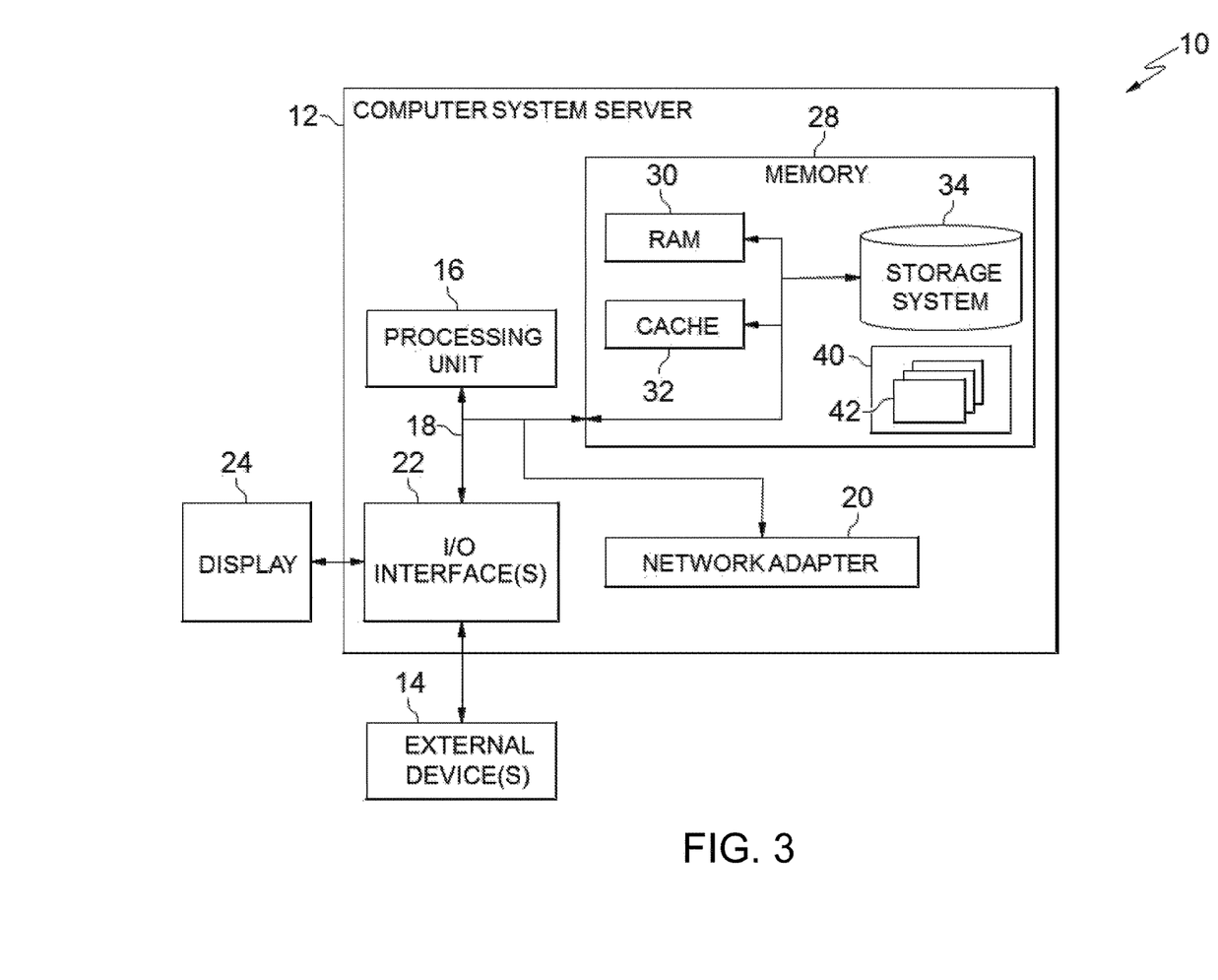
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of the embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Personal device displays are generally configured to present information to single user at a time, generally the person authorized to operate the device as a user. However, an authorized user may intentionally or unintentionally share the screen of their device with another person. For example, the user may elect to show a friend a photograph on a phone display, or to show a work colleague a spreadsheet display of database data or analysis output. The user may also leave a display screen active (unlocked) while it is unattended, enabling others to see information displayed thereon.

Message notification applications may automatically generate and display notifications on device screens at sudden and unpredictable times, including when the user is currently sharing the screen display with another person or allowing the other person to look at the screen display, or while the screen is unattended. Such notifications may obscure or preempt portions of other content that would otherwise be displayed to the other person, for example blocking the view of a photograph that the user wishes to share with another viewer.

While showing information to work colleague on a laptop screen, a notification message may suddenly appear that contains or conveys personal information that a user does not wish to share or disclose to the colleague, including personal and confidential information. For example, a banner notification of a text message may expressly identify a sender, or a subject or a portion of content of the message that the user of the devices does not wish to not divulge to another person viewing the screen, or is near enough to view the screen.

Banner notifications may inherently provide information as a function of context of the notification. For example, the employer of a user of a device may recognize that a sender identified within a banner notification on the user's device display is an employment agency, and thereby infer that the subject of the message is a solicitation to the user to consider employment with another, competitor employer. While the inference may be incorrect (for example, the sender may actually be relative or personal friend of the user and the message subject may be entirely unrelated to competitor employment offers), the erroneous inference by the employer may have deleterious effects on the career of the user with the current employer.

FIG. 4 illustrates a process or system according to the present invention for attention based alert notifications. At 102, in response to receipt of a notification event by a personal device (mobile phone, tablet, laptop, desktop, etc.) of a first user for display on a display screen of the personal device, the system or process determines the identity of each user who currently has a view of the device display. The notification event includes a request to generate and display upon the device display an alert presentation associated with the notification event (for example, a banner notification, a pop-up notification, etc.) that visually conveys to a viewer information identifying the event (for example, "new text message," "calendar appointment in fifteen minutes," etc.), and optionally other content associated with the event, such as identification of the person initiating the event (for example, "from Jane Doe," "Job interview at Big Corp.," etc.) and substantive content of the event (for example, "on my way home," "at Big Corp., 5555 Main Street, Any Town . . . ", etc.)

The personal device is configured to recognize only one single, unique person as the authorized user of the personal device. Accordingly, at 104 the process or systems determines whether persons identified as currently having a view of the device display include (consist of) only the person authorized to operate the personal device, and thus, no other people (people who are not the owner of the device or logged into the device as the unique owner of the device). If so, then the alert notification is displayed on the display screen of the personal device at 106; otherwise, if not, the process moves on to 108.

At 108 the identities of the other people determined to currently have a view of the device display are determined.

At 110 the identities of said other people are compared to pre-defined rules to determine if it is appropriate to show the alert notification while they currently have a view of the device display. If so, then the alert notification is displayed on the display screen of the personal device at 106; otherwise, if not, the process moves on to 112.

At 112 content analysis is performed on the alert notification and any content to be displayed with the alert notification at 106. At 114 the process determines whether display of the alert notification or any content associated therewith (inherently or expressly) to any of the other identified people conflicts with a privacy setting defined for, or by, the authorized first user, in some aspects as defined with respect to attributes of the identities of said other people. If not, then the alert notification is displayed on the display screen of the personal device at 106; otherwise, if so, the process mutes the alert notification at 116 (wherein the alert notification or associated content is not displayed on the screen).

FIG. 5 is alternative embodiment of the present invention that determines when it is appropriate to audibly broadcast alert tones or recitations of message content associated with an alert notification. Some alert applications and services read aloud selective content of emails and text messages, including sender identifications ("you have a new text message from Janet"). Aspects establish via the processes at 202, 204 and 208 the identities of persons (other than the authorized, first user of the device) that are nearby or proximate enough to the first user's mobile device to hear alert tones or other audible content of an alert notification broadcast on a speaker of (or in communication with) the mobile device. At 210 the identities of said other people are compared to pre-defined rules to determine if it is appropriate to broadcast audible alert notification content while they are proximate to the device speaker. If so, then the alert notification content is broadcast on the personal device speaker at 206; otherwise, if not, the process moves on to content analysis at 212.

At 214 the process determines whether broadcast of the alert notification content to any of the other identified, proximate people conflicts with a privacy setting defined for, or by, the authorized first user, in some aspects as defined with respect to attributes of the identities of said other people (for example, the message is private, the message and should not be overheard by certain people, and so forth). If not, then the alert notification content is broadcast on the personal device speaker at 206; otherwise, if so, the process mutes the alert notification broadcast at 216.

Figure 6:
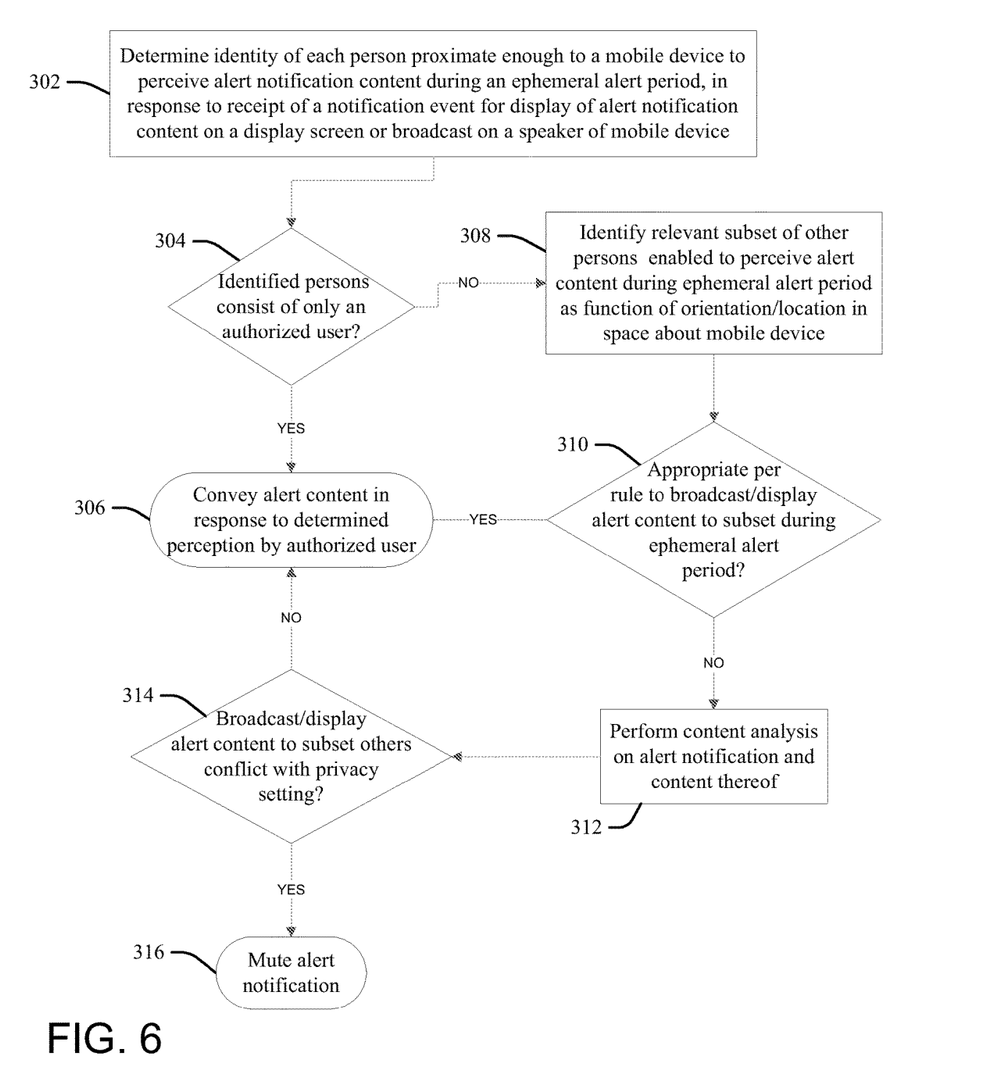
FIG. 6 is a flow chart illustration of attention based alert notification according to another embodiment of the present invention.

FIG. 6 illustrates an alternative embodiment of the present inventions that identifies relevant subsets of persons that are within a specified proximity to a mobile device for selective alert notification as a function of their likely perception of alert notification content during a time period of an ephemeral alert, wherein the ephemeral alert persists only for an alert time period. At 302 persons are identified that are proximate enough to a mobile device to perceive alert notification content during an ephemeral alert period. Examples of a proximity enabling a persons to perceive alert notification content include having a view of a display screen within a distance that enables the viewer to identify image content or read and understand text content displayed in a banner notification that disappears after a number of seconds, and being near enough to a speaker of the mobile device to hear and understand audible alert tones or content during a time of broadcast of the audible content.

In response to determining that said identified persons include only (consist of) the person authorized to use the mobile device 304, at 306 the ephemeral alert content is broadcast or displayed to the authorized user in response to confirming that he or she is enabled to perceive alert content during the ephemeral alert period as a function of their orientation and/or location in space about mobile device.

In response to determining that said identified persons include persons other than the person authorized to use the mobile device 304, at 308 a relevant subset of the other persons is identified that are enabled to perceive alert content during the ephemeral alert period as a function of their orientation and/or location in space about the mobile device.

More particularly, the ephemeral alert content only persists for, and is perceptible only during, a predefined alert period, and then disappears or stops broadcasting. Aspects enhance privacy relative to the prior art by providing the ephemeral content only when the authorized user is actually able to perceive and pay attention to the alert at 306, avoiding the display of alert message content by an unattended mobile device. Further, with respect to limiting the provision of the alert content by displays or speakers, only a subset of other persons that are nearby are of interest, those that are currently or able or likely to be oriented toward (actively facing or otherwise looking at) the mobile device display screen during the ephemeral display period.

The relevant subset may also be identified as those close enough to the speaker to distinguish broadcast tones or audible alert content from other sounds, including from background audio content and noise, conversations, etc., that may drown out or compete for the attention of the other person during the ephemeral period. The remaining (remainder) others of the persons are not likely able to perceive the alert content, and are thereby disregarded from considerations in determining whether or not to mute the alert at 310-312-314.

Thus, at 310 the identities of said other relevant subset of the people are compared to pre-defined rules to determine if it is appropriate to display or broadcast audible alert notification content for the ephemeral alert period. If so, then the alert notification content is broadcast or displayed at 306; otherwise, if not, the process moves on to content analysis at 312. At 314 the process determines whether broadcast or display of the alert notification content to any of the relevant subset persons conflicts with a privacy setting defined for, or by, the authorized first user, in some aspects as defined with respect to attributes of the identities of said subset people. If not, then the alert notification content is broadcast or displayed at 306; otherwise, if so, the process mutes the alert notification broadcast or display at 316.

Generally, the unique, authorized user may manually retrieve muted alerts at some subsequent time, such as when the user is alone or otherwise outside the presence of the other people identified as having a view of the device display. In some aspects, muting includes determining a more appropriate place to send the notification. For example, where the first user is sharing a personal device screen with a work colleague, muting suppresses display of the alert notification on the shared screen and also sends the muted notification to another personal device of the first user for which a display screen is not currently within the view of the colleague, such as the first user's smart phone. The processes of FIG. 4, 5 or 6 may also be applied to this re-routed notification on said second device or any other personal device of the first user that may receive the alert, to ensure that nobody is currently looking at the smart phone prior to displaying the notification on the smart phone.

Determining the identities of each user who currently has a view of the device display includes via the use of a front facing camera device of the personal user device that is aligned to acquire image information including the faces of people facing toward the display screen, for example a "selfie" camera on a mobile phone or tablet, a video chat camera located above a laptop screen, a web cam attached to the monitor of a desktop, etc. Aspects may activate such cameras to capture who has visual access to the display screen at the time of receipt of the notification event. Generally, the identification is through an image analysis of image data captured by the front-facing cameras to locate faces of persons within the captured image data through a facial detection process, and then identify the persons of the located faces through a facial recognition process. Facial recognition may compare the faces located and/or identified with faces tagged in a tagged photo library or as indicated in a user's connections within a social network service or other database associated with the user or identified person within the image to look for matches. Tagged faces may also be manually added to the system by the user. Tagged photo libraries may be stored locally on the device, on a cloud-based server, on a social network, etc., wherein aspects match located faces with faces of persons tagged in other pictures in the tagged photo library and thereby determined the identify of each matched face.

Personal identification may also be accomplished by reading identification data broadcast by devices worn by the persons within the image (for example, wireless fidelity (WiFi) or other broadcast data), etc. Aspects may also determine (likely) identification categories, such as work status based on attire (for example, identifying another viewing person as a work colleague in response to recognizing business suit attire, or as a social friend in response to identifying a sport team uniform categorizing the other person as a teammate or opponent of the user).

Determined attributes may be used in combination to determine the identity of the other person, for example concluding that a person determined to be female and wearing business attire is a specific colleague when the device is a personal device geographically located in the business office of the specific colleague, and the only persons having a current view of the display screen are the first user and this other person.

Persons having a view of the display screen may also be identified from voice inputs received by a microphone of the personal device, independently or in combination with the front-facing camera data. Independent of the camera data, microphone inputs may be used to identify the presence of other persons by the presence of voice data recorded from their speech, or from other sounds associated with the presence or movement of the other persons that are distinguished with sounds emanating from or caused by the authorized (first) device user. In some aspects, identifications of the other persons are made by matching their unique voice profile data to stored data associated with their identities. Gender, age or other demographic data of the other persons may also be determined by voice data attributes.

Aspects may also use data from accelerometers incorporated in smart phones or tablets or other mobile devices to capture and recognize movements of the devices in space that may result in reorientation of the display screen within the view, or potential view, of another, unauthorized person. For example, aspects may thereby detect rotating movement of the mobile device which indicate that the authorized user has turned around a mobile device to show the screen to another person (for example to show that person a picture currently displayed on their device), wherein the authorized user is no longer facing the device display, the process responsively muting any alert notifications until the identification of the person is processed, or the device is turned back to face only the authorized user.

Aspects may also utilize external data sources for personal identifications of relevant subsets of the other persons. For example, the user's calendar, location, social network postings, or geographic locations of social network check-ins may indicate identities or attributes of the persons useful in establishing identities. More particularly, a user's calendar appointment may indicate the identity of the other person viewing the screen, indicating who they are scheduled to meet with at the current time ("10 am—Meeting with Sandy to discuss proposal.") Social network posting may also indicate identities ("At the game with my friend Sandy"). A user's current location may indicate the likely identity of the other person, via nearby proximity ("mobile device located at Sandy's house"). Social network data from the other persons may also be considered and used, for example check-ins by social network connections of the user indicate who else is nearby ("Sandy just checked in at Location X," when the first user's device is also at Location X). Locations may be determined using global positioning satellite (GPS) coordinate data or other geo-location means with respect to the user's mobile device.

Rules applied to the identified, other persons include blanket or global rules applicable to all persons other than the authorized user. For example, if any other person is detected as having visual access to the screen of the personal device, then mute the notification regardless of notification type or other person identity (thereby effectively bypassing content analysis processes).

Application of identity or attribute based rules may mute a notification if the identity or attribute of the other viewing person meets specific criteria (optionally bypassing content analysis processes). For example, "mute notifications if Sandy is identified"; "mute notifications if anybody wearing a suit is identified."

Application of notification source based rules may mute notifications based upon the notification source or type. For example, "mute all text message notifications if any other person has visual access to the screen" would not mute a calendar appointment, missed call or other type of alert. "Mute all alerts associated with John Smith" would mute any text message, missed phone call or email message alerts identified as originating from John Smith.

Application of composite rules may mute alerts in response to a combination of identity and notification source rules. For example, "mute text message notifications only if Sandy is identified as sender," would not mute alerts from emails from Sandy.

Context-based analysis of notification content and identity examines the content of the notification to be displayed, for example processing text content using Natural Language Processing, and analyzing the relationship between the notification content and the other persons who may be able to read it. Content analysis and responsive decisions to convey or mute alerts may examine aspects of a notification including the notification sender, the originating application of the notification, and the notification content.

Content analysis techniques include a Natural Language Processing Deep Parsing component that breaks down and extracts sematic meaning from the notification (subject, sender identification, etc.) A Natural Language Classifier component may classify notifications into pre-defined categories, such as personal, work, promotional, time-dependent alert, etc.

A Tone Analyzer component may analyze the tone of writing content or other contextual data to determine a tone of the notification or associated message, such as emotional, formal, aggressive, etc., wherein the decision to convey or mute alert content is dependent upon correlation of an aspect of identity of relevant other persons to the determined tone (for example, mute if the tone is angry if the other person is a work colleague, etc.)

Thus, the determinations as to convey or mute an alert are generally a function of comparing the content analysis outputs to identities or attributes of the other persons. Comparative analysis looks for conflicts including classification conflicts, wherein the alert is muted in response to conflicting notification and viewing person classifications. For example, deciding to mute the alert if the viewing other person is classified as a business colleague, and the notification message content is classified as containing personal, non-business content. Other conflicts considered in comparative analysis include the following:

Privacy conflict: The tone of meaning of the notification may indicate that the content is private, for example a personal message from a partner, or a message about an unpaid bill, and thus is not displayed to other persons identified as business colleagues, or unless they are identified as immediate family members (for example, a parent).

Relationship conflict: The content of the notification conflicts with the interests of the viewing other person. For example, a viewing person is identified as a plumber providing a quote (based on calendar appointment analysis, facial recognition, etc.) A notification of an email from another plumber offering an alternate quote would be considered a relationship conflict and muted from display to the viewing plumber.

Tonal conflict: The alert is muted if the tone of the notification is inappropriate for the current situation. For example, the other viewing person is identified as a business executive, and content analysis determines that the notification contains content that is NSFW ("not suitable for work"), such opinions or commentary with regard to news or current events that are entirely unrelated to the field of work of the business executive.

Usage conflict: The use of the personal device indicates it would be inappropriate to interrupt with a notification. For example if a user is showing a picture on their mobile device to another viewing person, it would not be appropriate to obscure that picture with a notification, resulting in muting of the alert notification.

Some aspects use eye tracking technology to identify the subsets of the persons located within view of the display device that are currently or able or likely to be actively facing or otherwise actively looking at the screen at a given point in time within the ephemeral alert period, as distinguished from remaining others for which the eye tracking data indicates that they are not likely to be looking at the screen during the ephemeral alert period.

Subsets of the other persons actually within perceptible range of the displayed or broadcast alert notification during a given relevant time period may also be identified from sound and other voice inputs received by a microphone of the personal device, and rotational movement inputs received from accelerometers, independently or in combination with front-facing camera data. Microphone inputs may be used to determine the ability of the other persons to see the screen as a function of proximity of persons associated with correlated voice inputs to the screen, for example, to determine whether they are near enough to read and understand text content within the alert notification display). Directional data, including rotational accelerometer data and directional data of the voice inputs as they relate to the screen, may also establish their ability to see a screen, or to not see a screen from a location to the side or behind the screen during the ephemeral display time period.

Thus, aspects of the present invention address disadvantages in the prior art with regard to the display or broadcast of notifications on personal devices such as mobile phones, tablets, laptops, and desktops. Aspects determine when it is appropriate to show or broadcast a given notification based upon whom, in addition to the user, is looking at a screen of a mobile personal device at a current point in time, so as to prevent other, unauthorized persons to perceive inherent or explicit alert content.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor the steps of:

identifying persons that are proximate enough to a mobile device to perceive alert notification content during an ephemeral alert period;

in response to determining that the identified persons comprise an authorized user of the mobile device, and another person that is not authorized to use the mobile device, identifying a relevant subset of the identified persons that are oriented in space relative to the mobile device to perceive the alert notification content during the ephemeral alert period;

determining a type of relationship of the another person to the authorized user of the mobile device as a function of identity attributes of the another person;

in response to determining that conveying the alert notification content to the another person is permitted as a function of the identified type of relationship to the authorized user, and to determining that the authorized user is oriented in space relative to the mobile device to perceive the alert notification content during the ephemeral alert period, conveying the alert notification content to the authorized user and to the relevant subset of the identified persons during the ephemeral alert period;

muting the alert notification in response to determining that conveying the alert notification content to the identified another person is not permitted as a function of the identified type of relationship to the authorized user;

activating a front-facing camera of the mobile device to capture image data of the persons that are proximate enough to the mobile device to perceive the alert notification content during the ephemeral alert period;

determining through an image analysis process a type of attire of the another person that is visible within the captured image data; and determining that conveying the alert notification content to the another person is not permitted as a function of determining that the type of relationship to the authorized user is a business relationship, in response to determining that the type of attire of the another person is a business attire type.

2. The method of claim 1, further comprising:

in response to determining that the identified persons consist only of the authorized user, and that the authorized user is oriented in space relative to the mobile device to perceive the alert notification content during the ephemeral alert period, conveying the alert notification content to the authorized user during the ephemeral alert period.

3. The method of claim 1, further comprising:

identifying the relevant subset of the identified persons as persons that are close enough to a speaker of the mobile device to distinguish audible alert content broadcast on a speaker of the mobile device speaker from background audio content and noise, wherein the step of conveying the alert notification content is selected from the group consisting of broadcasting an alert signal on the mobile device speaker and broadcasting audible alert notification content on the mobile device speaker.

4. The method of claim 1, further comprising:

locating faces of the persons within the captured image data through an image analysis facial detection process;

determining the identifying attributes of the another person to comprise a first unique name that is tagged in association with stored face image data that matches a face of the another person located within the captured image data through the image analysis facial detection process; and determining that conveying the alert notification content to the identified another person is not permitted as a function of determining that that conveying the alert notification content to the first unique name is not permitted.

5. The method of claim 1, further comprising:

determining the identifying attributes of the another person to comprise a second unique name by matching the second unique name to a name that is listed within text data of event data, wherein the event data is selected from the group consisting of a calendar event occurring during the ephemeral alert period, and a social network posting event occurring during the ephemeral alert period at a geographic location that matches geographic location data of the mobile device; and determining that conveying the alert notification content to the identified another person is not permitted as a function of determining that that conveying the alert notification content to the second unique name is not permitted.

6. The method of claim 1, further comprising:

using eye tracking technology to identify the relevant subset of the identified persons that are oriented in space relative to the mobile device to perceive the alert notification content during the ephemeral alert period as ones of the identified persons that are facing a display screen of the mobile device during the ephemeral alert period, wherein the step of conveying the alert notification content is selected from the group consisting of displaying image content on the mobile device display screen and displaying text content on the mobile device display screen.

7. The method of claim 6, further comprising:

using eye tracking technology to determine that the authorized user is facing the mobile device screen; and wherein the step of using eye tracking technology to identify the relevant subset of the identified persons that are oriented in space relative to the mobile device to perceive the alert notification content during the ephemeral alert period as the ones of the identified persons that are facing the mobile device display screen during the ephemeral alert period is responsive to rotational data from an accelerometer of the mobile device indicating that the mobile device display screen is rotated away from an orientation in space that is associated with the determination that the authorized user is facing the mobile device display screen.

8. The method of claim 1, further comprising:

integrating computer-readable program code into a computer system comprising a processor, a computer readable memory and a computer readable storage medium, wherein the computer readable program code is embodied on the computer readable storage medium and comprises instructions that, when executed by the processor via the computer readable memory, cause the processor to perform the steps of identifying the persons proximate enough to the mobile device to perceive the alert notification content during the ephemeral alert period, identifying the relevant subset of the identified persons in response to determining that the identified persons comprise the authorized user of the mobile device and another person, determining the type of relationship of the another person to the authorized user, conveying the alert notification content to the authorized user and to the relevant subset of the identified persons during the ephemeral alert period in response to determining that conveying the alert notification content to the another person is permitted as a function of the identified type of relationship to the authorized user and to determining that the authorized user is oriented in space relative to the mobile device to perceive the alert notification content during the ephemeral alert period, muting the alert notification in response to determining that conveying the alert notification content to the identified another person is not permitted as a function of the identified type of relationship to the authorized user, activating the front-facing camera of the mobile device to capture image data of the persons proximate enough to the mobile device to perceive the alert notification content during the ephemeral alert period, determining through the image analysis process the type of attire of the another person that is visible within the captured image data, and determining that conveying the alert notification content to the another person is not permitted as the function of determining that the type of relationship to the authorized user is the business relationship, in response to determining that the type of attire of the another person is the business attire type.

9. The method of claim 8, wherein the computer-readable program code is provided as a service in a cloud environment.

10. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

identifies persons that are proximate enough to a mobile device to perceive alert notification content during an ephemeral alert period;

in response to determining that the identified persons consist only of an authorized user of the mobile device, and that the authorized user is oriented in space relative to the mobile device to perceive the alert notification content during the ephemeral alert period, conveys the alert notification content to the authorized user during the ephemeral alert period;

in response to determining that the identified persons comprise another person in addition to the authorized user that is not authorized to use the mobile device, identifies a relevant subset of the identified persons that are oriented in space relative to the mobile device to perceive the alert notification content during the ephemeral alert period;

determines a type of relationship of the another person to the authorized user of the mobile device as a function of identity attributes of the another person;

in response to determining that conveying the alert notification content to each of the another person is permitted as a function of the identified type of relationship to the authorized user, and to determining that the authorized user is oriented in space relative to the mobile device to perceive the alert notification content during the ephemeral alert period, conveys the alert notification content to the authorized user and to the relevant subset of the identified persons during the ephemeral alert period;

mutes the alert notification in response to determining that conveying the alert notification content to the identified another person is not permitted as a function of the identified type of relationship to the authorized user;

activates a front-facing camera of the mobile device to capture image data of the persons that are proximate enough to the mobile device to perceive the alert notification content during the ephemeral alert period;

determines through an image analysis process a type of attire of the another person that is visible within the captured image data; and determines that conveying the alert notification content to the another person is not permitted as a function of determining that the type of relationship to the authorized user is a business relationship, in response to determining that the type of attire of the another person is a business attire type.

11. The system of claim 10, wherein the processor executes the program instructions stored on the computer-readable storage medium via the computer readable memory and thereby:

uses eye tracking technology to identify the relevant subset of the identified persons that are oriented in space relative to the mobile device to perceive the alert notification content during the ephemeral alert period as ones of the identified persons that are facing a display screen of the mobile device during the ephemeral alert period;

wherein the processor conveys the alert notification content by a conveyance selected from the group consisting of displaying image content on the mobile device display screen and displaying text content on the mobile device display screen.

12. The system of claim 10, wherein the processor executes the program instructions stored on the computer-readable storage medium via the computer readable memory and thereby:

locates faces of the persons within the captured image data through an image analysis facial detection process;

determines the identifying attributes of the another person to comprise a first unique name that is tagged in association to stored face image data that matches a face of the another person located within the captured image data through the image analysis facial detection process; and determines that conveying the alert notification content to the identified another person is not permitted as a function of determining that that conveying the alert notification content to the first unique name is not permitted.

13. The system of claim 10, wherein the processor executes the program instructions stored on the computer-readable storage medium via the computer readable memory and thereby:

determines the identifying attributes of the another person to comprise a second unique name by matching the second unique name to a name that is listed within text data of event data, wherein the event data is selected from the group consisting of a calendar event occurring during the ephemeral alert period, and a social network posting event occurring during the ephemeral alert period at a geographic location that matches geographic location data of the mobile device; and determines that conveying the alert notification content to the identified another person is not permitted as a function of determining that that conveying the alert notification content to the second unique name is not permitted.

14. A computer program product, comprising:

a computer readable storage medium having computer readable program code embodied therewith, wherein the computer readable storage medium is not a transitory signal per se, the computer readable program code comprising instructions for execution by a processor that cause the processor to:

identify persons that are proximate enough to a mobile device to perceive alert notification content during an ephemeral alert period;

in response to determining that the identified persons consist only of an authorized user of the mobile device, and that the authorized user is oriented in space relative to the mobile device to perceive the alert notification content during the ephemeral alert period, convey the alert notification content to the authorized user during the ephemeral alert period;

in response to determining that the identified persons comprise another person in addition to the authorized user that is not authorized to use the mobile device, identify a relevant subset of the identified persons that are oriented in space relative to the mobile device to perceive the alert notification content during the ephemeral alert period;

determining a type of relationship of the another person to the authorized user of the mobile device as a function of identity attributes of the another person;

in response to determining that conveying the alert notification content to each of the another person is permitted as a function of the identified type of relationship to the authorized user, and to determining that the authorized user is oriented in space relative to the mobile device to perceive the alert notification content during the ephemeral alert period, convey the alert notification content to the authorized user and to the relevant subset of the identified persons during the ephemeral alert period;

mute the alert notification in response to determining that conveying the alert notification content to the identified another person is not permitted as a function of the identified type of relationship to the authorized user;

activate a front-facing camera of the mobile device to capture image data of the persons that are proximate enough to the mobile device to perceive the alert notification content during the ephemeral alert period;

determine through an image analysis process a type of attire of the another person that is visible within the captured image data; and determine that conveying the alert notification content to the another person is not permitted as a function of determining that the type of relationship to the authorized user is a business relationship, in response to determining that the type of attire of the another person is a business attire type.

15. The computer program product of claim 14, wherein the computer readable program code instructions for execution by the processor further cause the processor to:

use eye tracking technology to identify the relevant subset of the identified persons that are oriented in space relative to the mobile device to perceive the alert notification content during the ephemeral alert period as ones of the identified persons that are facing a display screen of the mobile device during the ephemeral alert period;

wherein the processor conveys the alert notification content by a conveyance selected from the group consisting of displaying image content on the mobile device display screen and displaying text content on the mobile device display screen.

16. The computer program product of claim 14, wherein the computer readable program code instructions for execution by the processor further cause the processor to:

locate faces of the persons within the captured image data through an image analysis facial detection process;

determine the identifying attributes of the another person to comprise a first unique name that is tagged in association to stored face image data that matches a face of the another person located within the captured image data through the image analysis facial detection process; and determine that conveying the alert notification content to the identified another person is not permitted as a function of determining that that conveying the alert notification content to the first unique name is not permitted.

17. The computer program product of claim 14, wherein the computer readable program code instructions for execution by the processor further cause the processor to:

determine the identifying attributes of the another person to comprise a second unique name by matching the second unique name to a name that is listed within text data of event data, wherein the event data is selected from the group consisting of a calendar event occurring during the ephemeral alert period, and a social network posting event occurring during the ephemeral alert period at a geographic location that matches geographic location data of the mobile device; and determine that conveying the alert notification content to the identified another person is not permitted as a function of determining that that conveying the alert notification content to the second unique name is not permitted.

* * * * *